US007013234B1

(12) United States Patent
Olmsted

(10) Patent No.: US 7,013,234 B1
(45) Date of Patent: Mar. 14, 2006

(54) SIMPLIFIED CONSTRUCTION SITE LAYOUT METHOD AND APPARATUS

(76) Inventor: Peter K. Olmsted, 1313 Luana St., Santa Fe, NM (US) 87505-3238

( * ) Notice: Subject to any disclaimer, the term of this patent is extended or adjusted under 35 U.S.C. 154(b) by 0 days.

(21) Appl. No.: 10/629,411

(22) Filed: Jul. 29, 2003

Related U.S. Application Data

(60) Provisional application No. 60/399,513, filed on Jul. 29, 2002.

(51) Int. Cl.
*G06F 15/00* (2006.01)
(52) U.S. Cl. .................... 702/150; 701/207; 356/141.4
(58) Field of Classification Search ................ 702/150, 702/158, 159; 356/3.09, 4.08, 5.01, 141.4; 700/83; 701/207; 382/118
See application file for complete search history.

(56) References Cited

U.S. PATENT DOCUMENTS

2003/0174305 A1* 9/2003 Kasper et al. ............. 356/3.09

OTHER PUBLICATIONS

Sacchi, R. et al, titled "Curvature Estimation for Segmentation of Triangulated Surfaces", 3-D Digital Imaging and Modeling, 1999. 2nd International Conference on Oct. 4-8, 2000, pp. 536-543.*

* cited by examiner

*Primary Examiner*—Kamini Shah
(74) *Attorney, Agent, or Firm*—Deborah A. Peacock; Jeffrey D. Myers; Peacock Myers, P.C.

(57) ABSTRACT

A method and apparatus which enables an individual user to determine corners and other points of interest in a construction site layout. Basic trigonometric calculations are made based on a dimensioned drawing which enables corners or other points of interest to be located by measurement to a plurality of known locations which preferably lie away from the working are of the construction site. The worker or workers then take these measurements to the site and measures the calculated distances from the know locations to determine the location of the points of interest.

5 Claims, 24 Drawing Sheets

View or Modify Wall Data

| Change | Add | | | | | OK | Cancel |
|---|---|---|---|---|---|---|---|

| Wall | Distance | | Angle | Radius | |
|---|---|---|---|---|---|
| | Feet | Inches | | Feet | Inches |
| 1 | 20 | 8 | 0.000000 | 0 | 0 |
| 2 | 4 | 0 | 270.000000 | 0 | 0 |
| 3 | 6 | 0 | 0.000000 | 0 | 0 |
| 4 | 4 | 0 | 90.000000 | 0 | 0 |
| 5 | 8 | 0 | 0.000000 | 0 | 0 |
| 6 | 6 | 4 | 90.000000 | 0 | 0 |
| 7 | 21 | 0 | 0.000000 | 0 | 0 |
| 8 | 20 | 0 | 90.000000 | 0 | 0 |
| 9 | 56 | 0 | 180.000000 | 0 | 0 |
| 10 | 26 | 0 | 270.000000 | 0 | 0 |

Wall  Angle (deg)                Distance
[ 1 ]  [ 0 ] ⊙ Global  [ 0 ] / [ 1 ]  [ 20 ]  [ 8 ]  [ 0 ] / [ 1 ]
         ○ Local                      Feet    Inches
       □ chord □ c_cc                         ⊙ CCW
                                              ○ CW Radius                              Arc        toCenter
[ 0 ]  [ 0 ]  [ 0 ] / [ 1 ]         [ 0 ]      [ 0 ]
Feet   Inches                       Inches

Fig. 4

```
pt:  1, distance A: 36.000000, distance B: 66.573268
pt:  2, distance A: 41.510374, distance B: 50.442487
pt:  3, distance A: 45.023451, distance B: 53.370820
pt:  4, distance A: 48.074017, distance B: 49.602867
pt:  5, distance A: 44.800794, distance B: 46.437533
pt:  6, distance A: 49.977773, distance B: 41.846280
pt:  7, distance A: 45.845150, distance B: 36.811834
pt:  8, distance A: 63.529521, distance B: 30.000000
pt:  9, distance A: 56.885851, distance B: 10.000000
pt: 10, distance A: 10.000000, distance B: 56.885851
pt: 11, distance A: 36.000000, distance B: 66.573268 pt:  1, distance A: 36'-0''     , distance B: 66'-6 7/8''
pt:  2, distance A: 41'-6 1/8'' , distance B: 50'-5 5/16''
pt:  3, distance A: 45'-0''     , distance B: 53'-4 7/16''
pt:  4, distance A: 48'-0''     , distance B: 49'-7 1/4''
pt:  5, distance A: 44'-9 5/8'' , distance B: 46'-5 1/4''
pt:  6, distance A: 49'-11 3/4'', distance B: 41'-10 1/8''
pt:  7, distance A: 45'-10 1/8'', distance B: 36'-9 3/4''
pt:  8, distance A: 63'-6 3/8'' , distance B: 30'-0''
pt:  9, distance A: 56'-10 5/8'', distance B: 10'-0''
pt: 10, distance A: 10'-0''     , distance B: 56'-10 5/8''
pt: 11, distance A: 36'-0''     , distance B: 66'-6 7/8''
```

Fig. 6

```
pt: 1,  distance A: 19.735045, distance B: 52.854116
pt: 2,  distance A: 59.855139, distance B: 14.071247
pt: 3,  distance A: 63.961567, distance B: 26.579023
pt: 4,  distance A: 77.096513, distance B: 34.566162
pt: 5,  distance A: 73.716875, distance B: 46.684947
pt: 6,  distance A: 63.802477, distance B: 42.316013
pt: 7,  distance A: 46.322306, distance B: 57.544014
pt: 8,  distance A: 43.070371, distance B: 54.960116
pt: 9,  distance A: 37.081759, distance B: 64.765232
pt: 10, distance A: 40.813675, distance B: 66.971893
pt: 11, distance A: 38.337398, distance B: 78.859425
pt: 12, distance A: 23.670731, distance B: 72.865330
pt: 13, distance A: 19.735045, distance B: 52.854116 pt: 1,  distance A: 19'-8 13/16'', distance B: 52'-10 1/4''
pt: 2,  distance A: 59'-10 1/4'',  distance B: 14'-0''
pt: 3,  distance A: 63'-11 9/16'', distance B: 26'-6 15/16''
pt: 4,  distance A: 77'-1 3/16'',  distance B: 34'-6 13/16''
pt: 5,  distance A: 73'-8 5/8'',   distance B: 46'-8 1/4''
pt: 6,  distance A: 63'-9 5/8'',   distance B: 42'-3 13/16''
pt: 7,  distance A: 46'-3 7/8'',   distance B: 57'-6 1/2''
pt: 8,  distance A: 43'-0'',       distance B: 54'-11 1/2''
pt: 9,  distance A: 37'-1'',       distance B: 64'-9 3/16''
pt: 10, distance A: 40'-9 3/4'',   distance B: 66'-11 11/16''
pt: 11, distance A: 38'-4 1/16'',  distance B: 78'-10 5/16''
pt: 12, distance A: 23'-8 1/16'',  distance B: 72'-10 3/8''
pt: 13, distance A: 19'-8 13/16'', distance B: 52'-10 1/4''
```

Fig. 10

```
pt: 1, distance A: 61.333333, distance B: 74.606457
pt: 2, distance A: 12.000000, distance B: 44.140071
pt: 3, distance A: 26.832815, distance B: 22.032281
pt: 4, distance A: 44.382178, distance B: 41.655721
pt: 5, distance A: 61.872256, distance B: 44.987000
pt: 6, distance A: 75.399629, distance B: 68.430218
pt: 7, distance A: 63.776710, distance B: 66.230327
pt: 8, distance A: 61.333333, distance B: 74.606457 pt: 1, distance A: 61'-4''      , distance B: 74'-7 1/4''
pt: 2, distance A: 12'-0''      , distance B: 44'-1 11/16''
pt: 3, distance A: 26'-10''     , distance B: 22'-0''
pt: 4, distance A: 44'-4 9/16'' , distance B: 41'-7 7/8''
pt: 5, distance A: 61'-10 7/16'', distance B: 44'-11 7/8''
pt: 6, distance A: 75'-4 13/16'', distance B: 68'-5 3/16''
pt: 7, distance A: 63'-9 5/16'' , distance B: 66'-2 3/4'
pt: 8, distance A: 61'-4''      , distance B: 74'-7 1/4''
```

Fig. 15

```
pt: 1, distance A: 70.946772, distance B: 123.153472
pt: 2, distance A: 49.509819, distance B: 112.180905
pt: 3, distance A: 43.666667, distance B: 133.982171
pt: 4, distance A: 15.000000, distance B: 127.551732
pt: 5, distance A: 127.551732, distance B: 15.000000
pt: 6, distance A: 133.982171, distance B: 43.666667
pt: 7, distance A: 112.180905, distance B: 49.509819
pt: 8, distance A: 123.153472, distance B: 70.946772
pt: a, distance A: 120.689223, distance B: 73.551015
pt: b, distance A: 118.198007, distance B: 76.178580
pt: c, distance A: 115.681270, distance B: 78.824042
pt: d, distance A: 113.140535, distance B: 81.482540
pt: e, distance A: 110.577403, distance B: 84.149700
pt: f, distance A: 107.993570, distance B: 86.821571
pt: g, distance A: 105.390836, distance B: 89.494568
pt: h, distance A: 102.771111, distance B: 92.165424
pt: i, distance A: 100.136437, distance B: 94.831151
pt: j, distance A: 97.489000, distance B: 97.489001
pt: k, distance A: 94.831150, distance B: 100.136437
pt: l, distance A: 92.165422, distance B: 102.771110
pt: m, distance A: 89.494565, distance B: 105.390835
pt: n, distance A: 86.821568, distance B: 107.993569
pt: o, distance A: 84.149696, distance B: 110.577401
pt: p, distance A: 81.482536, distance B: 113.140533 pt: q, distance A: 78.824037, distance B: 115.681268
pt: r, distance A: 76.178575, distance B: 118.198004
pt: s, distance A: 73.551009, distance B: 120.689219
pt: 9, distance A: 70.946772, distance B: 123.153472 pt: 1, distance A: 70'-11 3/8'' , distance B: 123'-1 13/16''
pt: 2, distance A: 49'-6 1/8'' , distance B: 112'-2 3/16''
pt: 3, distance A: 43'-8'' , distance B: 133'-11 13/16''
pt: 4, distance A: 15'-0'' , distance B: 127'-6 5/8''
pt: 5, distance A: 127'-6 5/8'' , distance B: 15'-0''
pt: 6, distance A: 133'-11 13/16'' , distance B: 43'-8''
pt: 7, distance A: 112'-2 3/16'' , distance B: 49'-6 1/8''
pt: 8, distance A: 123'-1 13/16'' , distance B: 70'-11 3/8''
pt: a, distance A: 120'-8 1/4'' , distance B: 73'-6 5/8''
pt: b, distance A: 118'-2 3/8'' , distance B: 76'-2 1/8''
pt: c, distance A: 115'-8 3/16'' , distance B: 78'-9 7/8''
pt: d, distance A: 113'-1 11/16'' , distance B: 81'-5 13/16''
pt: e, distance A: 110'-6 15/16'' , distance B: 84'-1 13/16''
pt: f, distance A: 107'-11 15/16'' , distance B: 86'-9 7/8''
pt: g, distance A: 105'-4 11/16'' , distance B: 89'-5 15/16''
pt: h, distance A: 102'-9 1/4'' , distance B: 92'-2''
pt: i, distance A: 100'-1 5/8'' , distance B: 94'-10''
pt: j, distance A: 97'-5 7/8'' , distance B: 97'-5 7/8''
pt: k, distance A: 94'-10'' , distance B: 100'-1 5/8''
pt: l, distance A: 92'-2'' , distance B: 102'-9 1/4''
pt: m, distance A: 89'-5 15/16'' , distance B: 105'-4 11/16''
pt: n, distance A: 86'-9 7/8'' , distance B: 107'-11 15/16''
pt: o, distance A: 84'-1 13/16'' , distance B: 110'-6 15/16''
pt: p, distance A: 81'-5 13/16'' , distance B: 113'-1 11/16''
pt: q, distance A: 78'-9 7/8'' , distance B: 115'-8 3/16''
pt: r, distance A: 76'-2 1/8'' , distance B: 118'-2 3/8''
pt: s, distance A: 73'-6 5/8'' , distance B: 120'-8 1/4''
pt: 9, distance A: 70'-11 3/8'' , distance B: 123'-1 13/16''
```

Fig. 18

```
pt: 1, distance A: 17.135611,  distance B: 83.943540
pt: 2, distance A: 19.343144,  distance B: 102.718285
pt: 3, distance A: 47.681527,  distance B: 88.797993
pt: a, distance A: 51.577011,  distance B: 87.489626
pt: b, distance A: 55.359944,  distance B: 85.947332
pt: c, distance A: 59.014426,  distance B: 84.175660
pt: d, distance A: 62.526363,  distance B: 82.179868
pt: e, distance A: 65.883058,  distance B: 79.965918
pt: f, distance A: 69.072961,  distance B: 77.540485
pt: g, distance A: 72.085499,  distance B: 74.910966
pt: h, distance A: 74.910974,  distance B: 72.085490
pt: i, distance A: 77.540493,  distance B: 69.072951
pt: j, distance A: 79.965924,  distance B: 65.883048
pt: k, distance A: 82.179874,  distance B: 62.526352
pt: l, distance A: 84.175666,  distance B: 59.014415
pt: m, distance A: 85.947336,  distance B: 55.359932
pt: n, distance A: 87.489629,  distance B: 51.576998
pt: 4, distance A: 88.797993,  distance B: 47.681529
pt: 5, distance A: 102.718285, distance B: 19.343147
pt: 6, distance A: 83.943541,  distance B: 17.135610
pt: 7, distance A: 66.185765,  distance B: 46.829478
pt: 8, distance A: 46.829478,  distance B: 66.185765
pt: 9, distance A: 17.135611,  distance B: 83.943540 pt: 1, distance A: 17'-1 5/8'' ,   distance B:  83'-11 5/16''
pt: 2, distance A: 19'-4 1/8'' ,   distance B:  102'-8 5/8''
pt: 3, distance A: 47'-8 3/16'' ,  distance B:  88'-9 9/16''
pt: a, distance A: 51'-6 15/16'' , distance B:  87'-5 7/8''
pt: b, distance A: 55'-4 5/16'' ,  distance B:  85'-11 3/8''
pt: c, distance A: 59'-0'' ,       distance B:  84'-2 1/8''
pt: d, distance A: 62'-6 5/16'' ,  distance B:  82'-2 3/16''
pt: e, distance A: 65'-10 5/8'' ,  distance B:  79'-11 9/16''
pt: f, distance A: 69'-0'' ,       distance B:  77'-6 1/2''
pt: g, distance A: 72'-1'' ,       distance B:  74'-10 15/16''
pt: h, distance A: 74'-10 15/16'' ,distance B:  72'-1''
pt: i, distance A: 77'-6 1/2'' ,   distance B:  69'-0''
pt: j, distance A: 79'-11 9/16'' , distance B:  65'-10 5/8''
pt: k, distance A: 82'-2 3/16'' ,  distance B:  62'-6 5/16''
pt: l, distance A: 84'-2 1/8'' ,   distance B:  59'-0''
pt: m, distance A: 85'-11 3/8'' ,  distance B:  55'-4 5/16''
pt: n, distance A: 87'-5 7/8'' ,   distance B:  51'-6 15/16''
pt: 4, distance A: 88'-9 9/16'' ,  distance B:  47'-8 3/16''
pt: 5, distance A: 102'-8 5/8'' ,  distance B:  19'-4 1/8''
pt: 6, distance A: 83'-11 5/16'' , distance B:  17'-1 5/8''
pt: 7, distance A: 66'-2 1/4'' ,   distance B:  46'-9 15/16''
pt: 8, distance A: 46'-9 15/16'' , distance B:  66'-2 1/4''
pt: 9, distance A: 17'-1 5/8'' ,   distance B:  83'-11 5/16''
```

Fig. 23

SIMPLIFIED CONSTRUCTION SITE LAYOUT METHOD AND APPARATUS

CROSS-REFERENCE TO RELATED APPLICATIONS

This application claims the benefit of the filing of U.S. Provisional Patent Application Ser. No. 60/399,513, entitled "Accu-Corner", filed on Jul. 29, 2002, and the specification thereof is incorporated herein by reference.

BACKGROUND OF THE INVENTION

1. Field of the Invention (Technical Field)

The present invention relates to laying out a design on a building site. More particularly the present invention relates to laying out building corners and curves on a building site.

2. Description of Related Art

When determining corners for a building or other construction site project, the builder must resort to one of several time-consuming, trial-and-error methods, all of which require a number of workers, or the builder must hire a surveyor. Regardless of which course of action is chosen, the cost of laying out a building at present is typically about $50 per corner, thus, a twenty-corner building will require approximately $1,000 just to determine its corners. After establishing the corners of a building on a site, regardless of the method employed, the builder must transfer each corner to what is commonly known in the art as a set of batter boards before excavation of the foundation can commence. This is so the corners can be re-established after excavation. The construction of batter boards is both material and labor intensive. To make matters worse, the introduction of batter boards to a job site severely impedes workers, such as the backhoe operator, as they attempt to excavate the foundation. It is difficult to maneuver heavy equipment around the site without running over several batter boards. Further, batter boards restrict the placement of newly-excavated dirt. There is thus a present need for a method and apparatus which would enable the determination of multiple corners of a building without requiring a set of batter boards for each.

BRIEF SUMMARY OF THE INVENTION

The present invention relates to a method for laying out a building having the steps of providing at least two batter points away from a boundary of the building, wherein the boundary comprises at least one line connecting at least two measurement points of the building, calculating distances between the at least two measurement points and the at least two batter points, and triangulating a location of the at least two measurement points. The method also preferably uses batter points which are comprised of at least one batter board. It is also preferable that at least one of the batter points be disposed outside of or within the boundary of the building.

In one embodiment of the present invention it is preferable to use building element data to determine relative positions of the at least two measurement points. The present invention preferably uses at least one measurement device to measure from a selected measurement point. This point is then preferably marked at the calculated distances from the at least two batter points.

The present invention also relates to a method for determining a set of layout measurements having the steps of receiving building element data, determining relative positions of at least two measurement points derived from the building element data, calculating distances between the at least two measurement points and at least two batter points located away from all of the at least two measurement points, and providing the calculated distances.

It is also preferable that the determining step has the steps of providing a first building element comprising at least one measurement point, placing a second building element comprising at least one measurement point at a required distance from the first building element at a required relative angle, placing a third building element adjacent comprising at least one measurement point at a required distance from the second building element at a required relative angle, and placing any remaining building elements in a likewise manner until a boundary of the building comprising the measurement points is complete. It is preferable that the second building element is placed adjacent to the first building element.

It is preferable that when providing the calculating distances, a list of all measurement points and the calculated distances from each measurement point to each batter point is provided. It is also preferable that this list has distances in units of feet and inches, as well as in units of feet and decimal fractions of a foot.

The present invention is also directed to a computer software product having a computer-readable storage medium in which program instructions are stored, which instructions, when read by a computer receiving building element data, cause the computer to assemble the building element data into a boundary of the building, determine relative positions of at least two measurement points derived from the building element data, calculate distances between the at least two measurement points and at least two batter points located away from all of the at least two measurement points, and display and/or output the calculated distances.

Other objects, advantages and novel features, and further scope of applicability of the present invention will be set forth in part in the detailed description to follow taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 4 is a computer-generated image showing the dimensions and angles for the line segments that were input by a user for example 1;

FIG. 6 is a printout of the output produced in accordance with example 1 of the present invention;

FIG. 10 is a printout of the output produced in accordance with example 2 of the present invention;

FIG. 15 is a printout of the output produced in accordance with example 3 of the present invention;

FIG. 18 is a printout of the output produced in accordance with example 4 of the present invention;

FIG. 23 is a printout of the output produced in accordance with example 5 of the present invention.

DETAILED DESCRIPTION OF THE INVENTION

Figure 1:
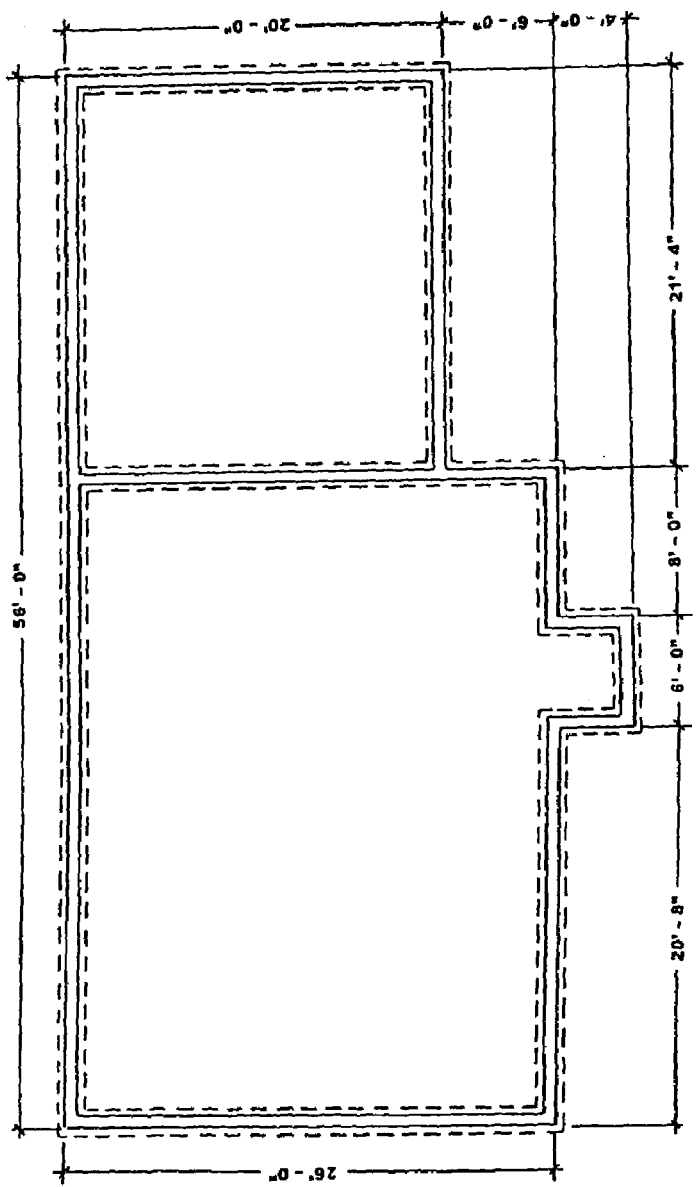
FIG. 1 is a computer-generated layout, with dimensions, of the building of example 1.

The present invention is directed to a method and apparatus for determining the placement of corners and points of arcs in construction sites where such elements exist. The present invention achieves this objective through the use of a computer program which produces triangulated measurements to each point based on the location of two user-defined points on the construction site.

A primary objective of the present invention is that an individual builder can lay out any building quickly and easily, without requiring the help of others. The present invention requires only one set of batter boards for an entire job, rather than a set for each corner or point, thus providing ample space to maneuver heavy equipment and deposit dirt.

As used throughout the specification and claims, the term "building" means building, house, shed, garage, stable, structure, monument, road, bridge, foundation, fence, footing, perimeter and the like.

As used throughout the specification and claims, the term "building element" means a foundation plan, wall start position, wall stop position, wall lengths, wall angles, curved wall radius, curved wall chord length, and the like.

As used throughout the specification and claims, the term "measurement point", or, synonymously, "point of interest" means corner, post, window, desired location, position along a wall, position along a curved wall, location of any feature of a building desired to be used to layout the building, and the like.

As used throughout the specification and claims, the term "wall" is used simply to maintain consistency and ease of understanding and is in no way meant to be limited to a physical wall. Rather it is intended to represent anything which substantially creates a line segment, such as an edge of a road, a distance between two or more points, a wall, a segment of a perimeter of a building and any other such similar equivalent.

As used throughout the specification and claims, the term "batter boards" and or "batter points" is meant to mean any location marking device such a stake, flag, pole, surveyor's stake, and other such similar devices and or apparatuses.

As used throughout the specification and claims, the term "distance measuring device" means measuring tape, surveyor's chain, laser distance measuring tool, ultrasonic distance measuring tool, electronic distance measuring tool, radio frequency distance measuring tool, infrared distance measuring tool, laser range finder, and any other device, apparatus, or method which can be used to determine or approximate a distance.

The present invention is a method for determining the placement of points of interest, such as corners and points along curves, for buildings. This is preferably achieved through the use of two batter points which are disposed external to the actual location of the building.

While not required, the present invention preferably uses a computer to calculate a distance from each of the two known points to each of the desired points of interest using basic trigonometric functions. A list of these distances can then be taken to the jobsite and used to triangulate the exact position of each of the desired points of interest.

In a preferred embodiment a dimensioned drawing of the building is obtained and each line segment representing a wall is input into a computer program. This is done by starting at any chosen line segment and entering its length into a length field. This data is preferably stored in the computer as well as being listed in a table and graphically displayed. In the graphical display it is preferred that the first line segment entered by the user be named "1" and that each subsequent line segment be sequentially numbered thereafter. The angles, corners, or other points of interest may also accordingly be labeled. The operator then can choose to use either global or local angles of measurement for determining the angle of each of the remaining lines. A local angle is simply the angle formed by the previous wall and the new wall. If the wall is extending vertically up from its start point (as viewed on the screen) the angle is positive. If the wall is extending vertically down from its start point, it is negative. Thus, if the starting line was horizontal then the local angle for a wall extending vertically up is +90°, while the local angle for a wall which extends vertically down from the horizontal line is −90°. It is preferred that if the user changes to the local angle setting for entering walls, the setting will change back to a global angle setting after the wall data are input. It is preferred that the wall angles be displayed as global angles on the resulting image on the computer, even if they were input as local angles.

In order to facilitate unobstructed access to the working portion of the jobsite, it is preferred that the user can determine a distance away from any one of the walls of the building for placement of the two batter points.

It is also preferred that a line segment, which is terminated by each of the batter points, lies substantially parallel with one of the walls of the building. The length of this line segment is preferably displayed in a field of the software user interface.

The computer software associated with the present invention preferably outputs two matrices of data. The first matrix contains a set of measurements, calculated from two known points, to each of the points of interest in decimal form. The second matrix contains the same set of measurements in feet and fractions of inches. While not preferred, the present invention is also capable of having similar output matrices which are in metric form or are based on yards or some other measuring unit.

While the present invention is capable of outputting the data to computer screens, such as those connected to desktop, laptop, and hand-held computers, it is also preferable that printouts containing the matrices of data can be obtained, thus enabling workers to take the data to the jobsite in a compact, inexpensive, and disposable form.

After all calculations have been obtained, the user places the two batter points in a location such that the resulting points of interest will be disposed where preferred. One or more measuring apparatuses are then used to determine the intersection of the calculated distances from each batter point. Each of these intersections may then be marked and each physical mark would then substantially correspond to a point of interest in initial drawing.

The present invention preferably is capable of determining the length of as well as a number of points along a curved portion of a building. It is preferred that the user enter line segments, which terminate the curved portion, as well as the desired radius of the curved portion. The computer program then preferably calculates the length of the curved portion as well as the measurements from each of the two batter points to each of a number of points along the curve. When the points along the curve are output, it is preferable that they be identified by a letter of the alphabet, while corners of the building be identified by numbers. Being represented by letters of the alphabet, it is preferred that the number of points along a curve to be represented be user defined from one to 26.

In one embodiment the present invention uses a computer program, which outputs a matrix of triangulated distances between each corner of a building and two stationary points on the building site. This matrix can be taken to the site and used to very accurately triangulate each corner relative to the two stationary points, called "batter points". The batter points are located in the field preferably on top of conventional batter boards. The user simply attaches a measuring tape to each batter point and crosses the tapes at the distances output on the matrix of triangulated data, dropping a plumb bob to the ground from the intersection of the two tapes.

The computer program used in the present invention also preferably has he ability to correct any inaccurate and or non-dimensioned walls based on other known wall lengths, as is shown in Example 3.

While a preferred embodiment of the present invention makes use of a computer for calculating the trigonometric functions used to determine the distance to each batter point from each point of interest, the present invention is also capable of working effectively from values which are calculated through other methods, such as by calculator or by hand.

INDUSTRIAL APPLICABILITY

The invention is further illustrated by the following five non-limiting examples which show how information can be taken from building plans and entered into the user interface of the present invention In each example, the present invention outputs a matrix of triangulated data, which the operator may then take to the field and use to lay out a building.

EXAMPLE 1

The present invention was produced. FIG. 1 is a drawing of which shows a floor plan of a simple building wherein all corners are at right angles. Data based on this floor plan was entered by the user through the "options" pull-down menu which enabled access to the "Points" screen. The Points screen was used to define the first wall of the building in terms of its direction and length. The first wall was automatically assigned the number one by the computer program. Wall two was automatically started at the end of wall one, opposite the start point of wall one. The software assigned angle measurements in such a manner that a line segment which extended to the right measured 0°, a line segment which extended directly up measured 90°, a line segment which extended directly to the left measured 180°, and a line segment which extended directly down measured 270°.

Figure 2:
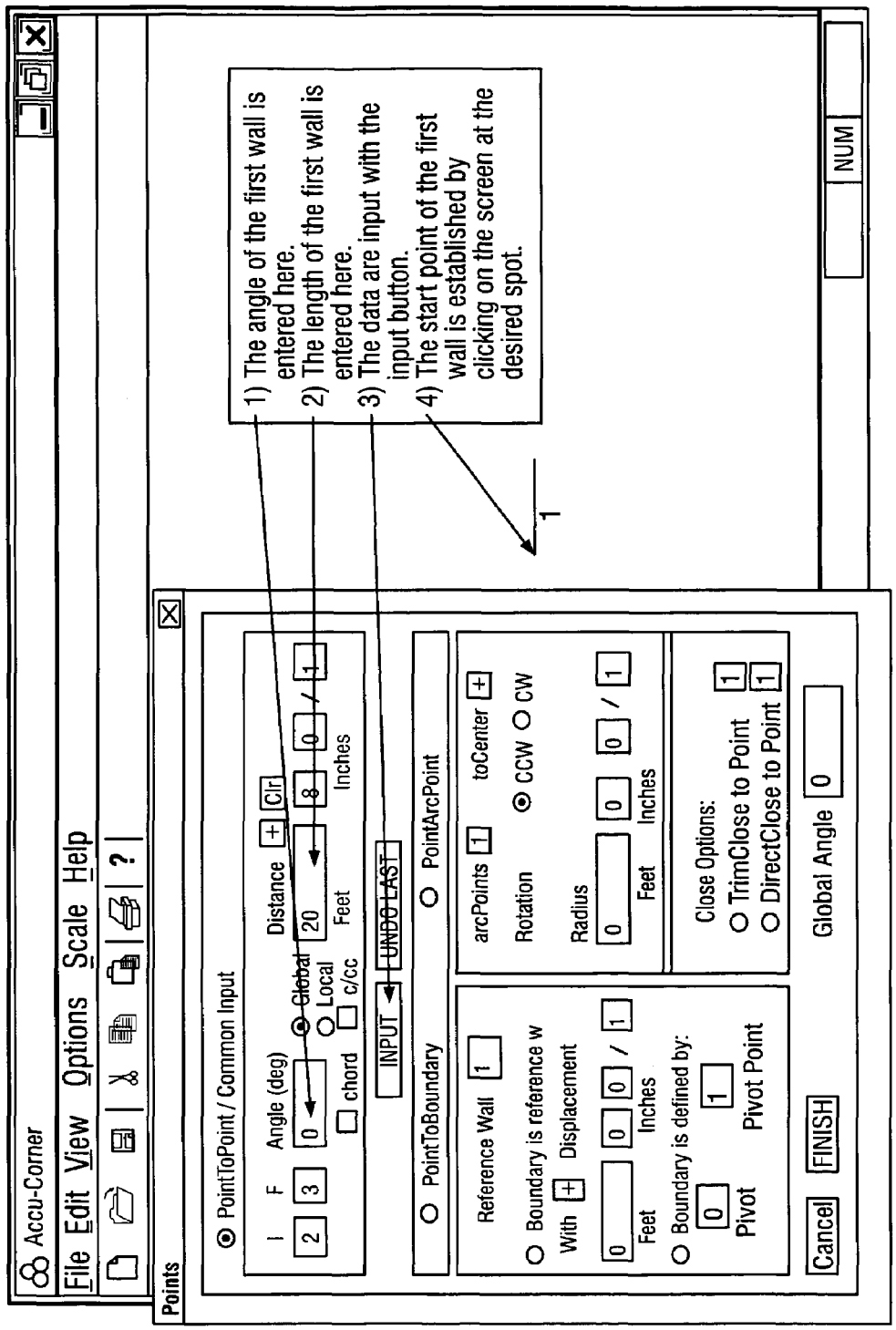
FIG. 2 is a computer-generated image showing the data entry fields of the user interface for the program of the present invention.

As shown in FIG. 2, information from the drawing was entered starting at the left end of the 20' 8" wall and traveling counter-clockwise around the building. Each subsequent wall was entered in terms of direction and length, using the Points screen. The only exception was the last wall (wall 10), which "closed" on point one. Here the operator chose to use the "Close Options" box in the lower right corner of the points screen. The operator simply clicked "Direct Close to point 1". 270° appeared in the "Global Angle" box, immediately below the Close Options box. This assured the operator that the corners at both ends of wall 10 are right angles.

Figure 3:
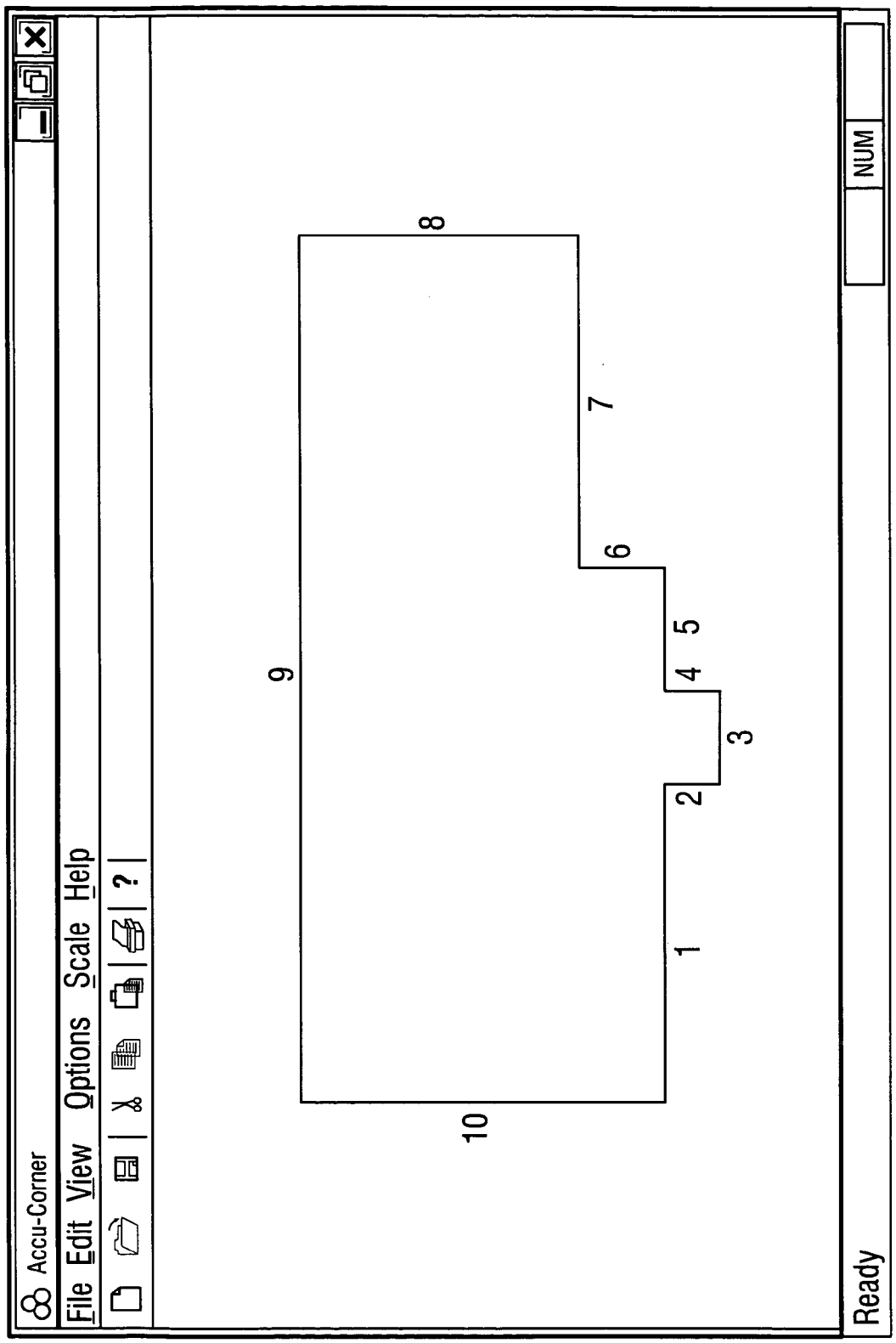
FIG. 3 is a computer-generated image showing the resulting line segments from data input by the user in example 1.

FIG. 3 is a computer-generated image of the outside of the foundation, which was generated by the user entering the wall data. The starting point of each wall had the same number as the wall. Corner number 1, for example, was the starting point for wall number 1 and corner number 9 was the starting point of wall number 9.

If the Global Angle box had shown an angle other than 270°, the operator could have gone to the options pull-down menu and selected "View or Modify Wall Data" (see FIG. 4). Here the operator could have checked for clerical errors and correct any that may have occurred.

Figure 5A:
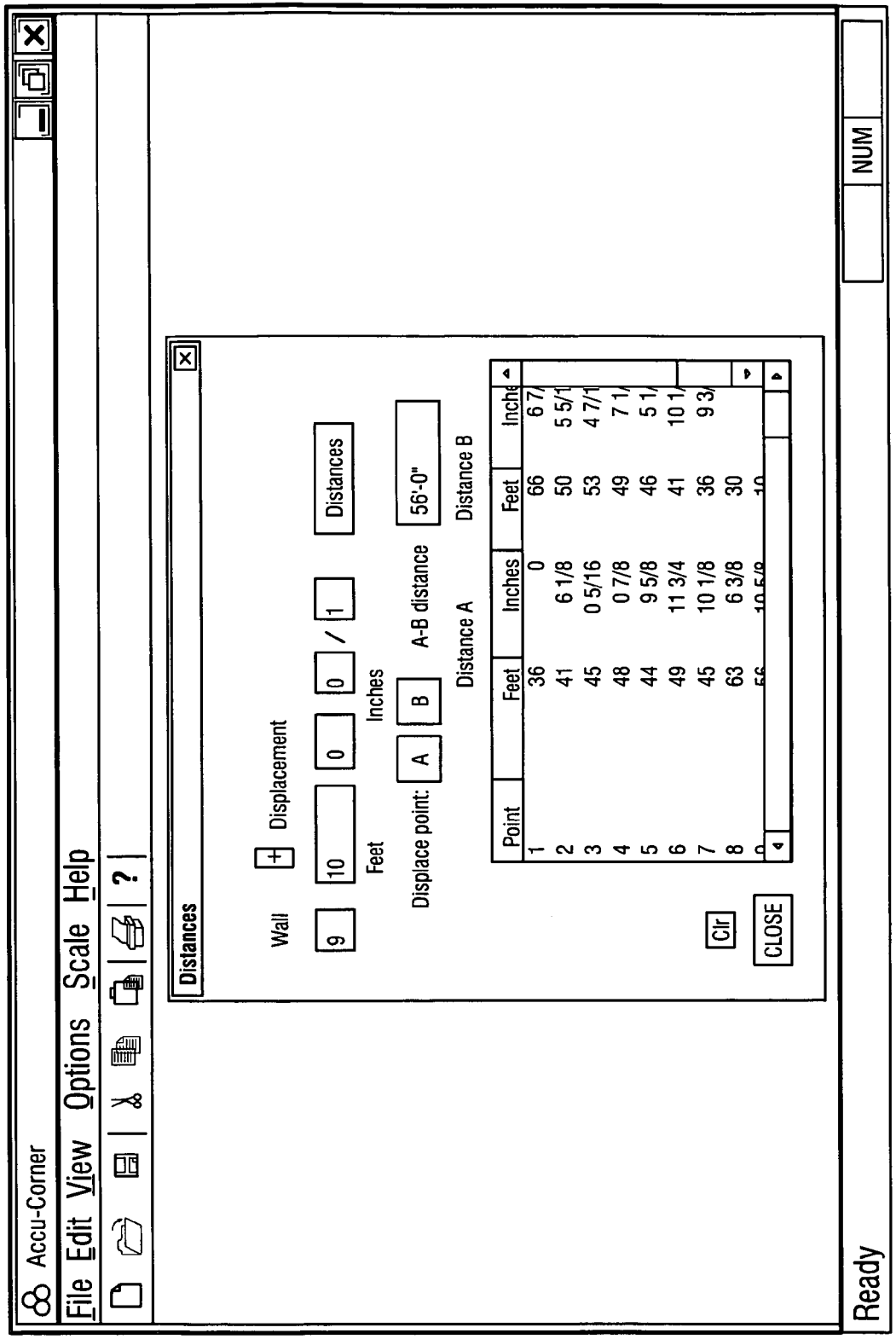
FIG. 5(A) is a computer-generated image showing distances and angles to various corners of a building from reference points A and B for example 1.
Figure 5B:
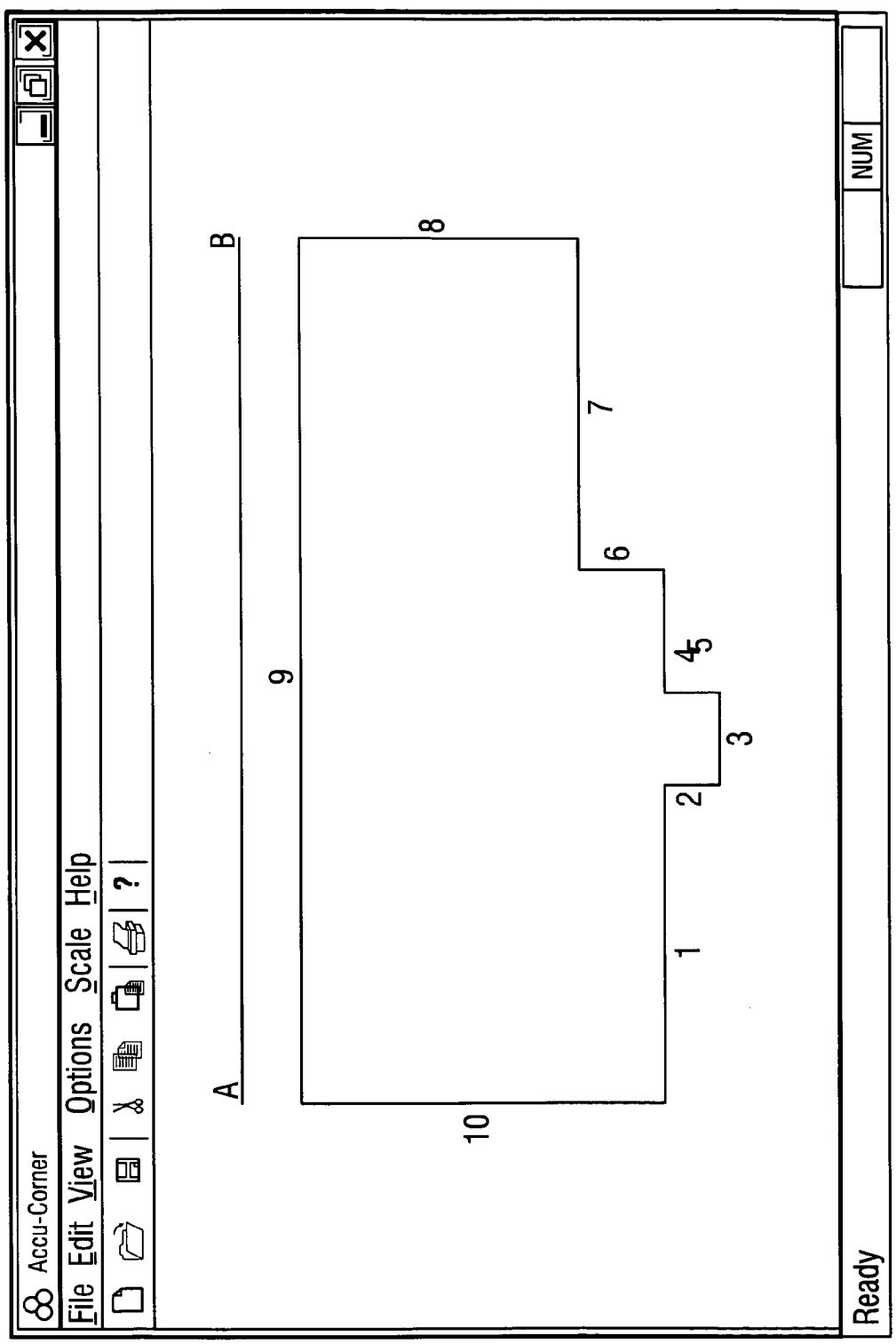
FIG. 5(B) is a computer-generated image showing the resulting outline of the building from data entered by the user in conjunction with the line segment terminating in reference points A and B.

After the outline of the building had been established, the operator went to the "Options" pull-down and brought up the "Distances" screen, shown in FIG. 5A. The operator used this screen to orient the ten corners of the building to two batter points (points A and B). Since the line segment containing the batter points must always be parallel to one of the ten walls, the operator chose to make the line containing the batter points parallel to wall 9. The operator chose to displace the batter points ten feet in a positive direction from wall 9. (The displacement is positive because the batter points are vertically disposed above wall 9. When the "Distances" button is clicked, the triangulated distances between the batter points and each corner are displayed in the large window as shown in FIG. 5B.

Finally, the operator went to the Options pull-down menu and selected the "Print Distances" option. This matrix of triangulated data (FIG. 6) was printed out and could thus be taken to the building site to lay out the building. Distances were given in feet and decimal fractions of a foot as well as in feet and inches. The layout person in the field, therefore, has the option of using either a surveyor's chain or a standard contractor's tape.

EXAMPLE 2

Figure 7:
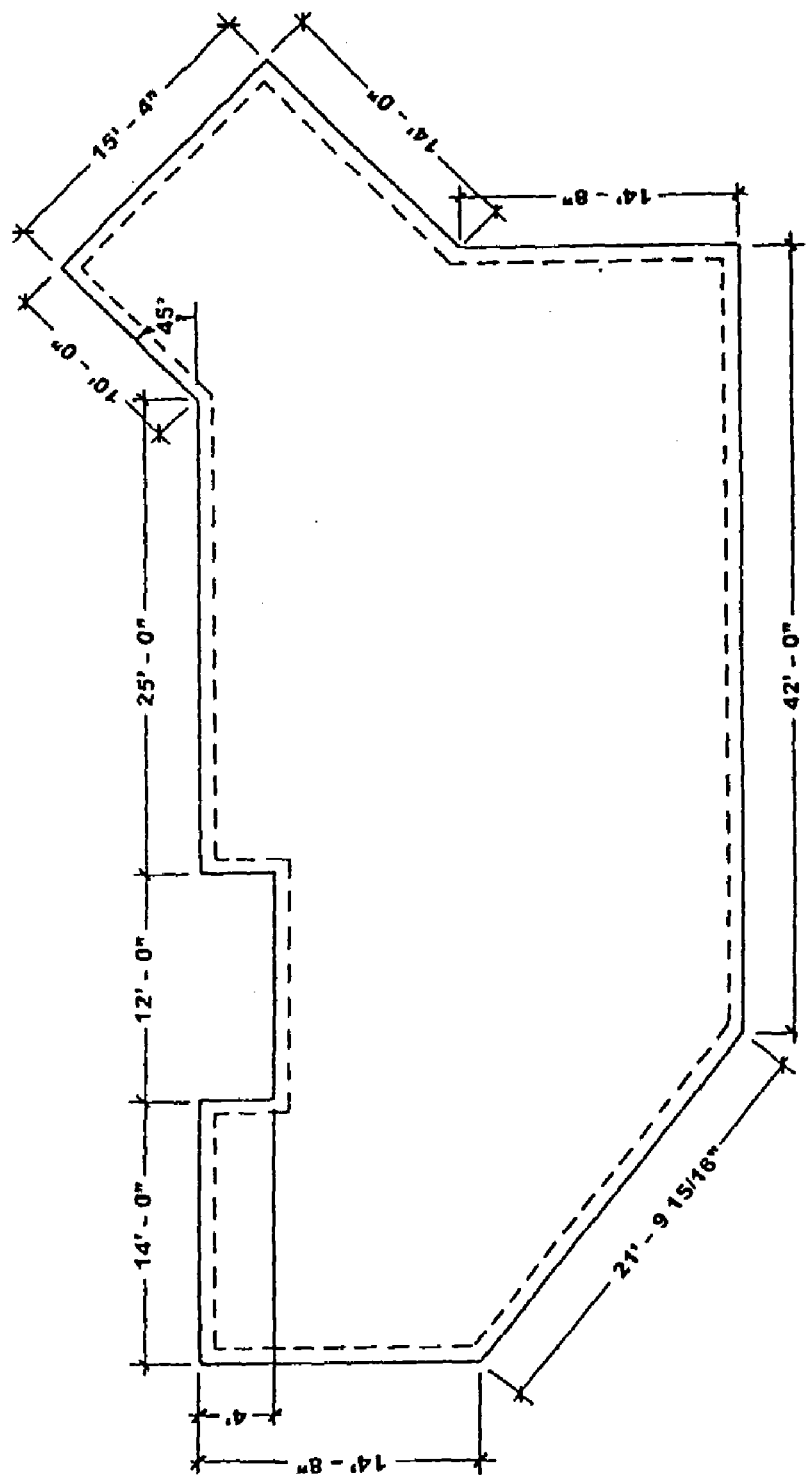
FIG. 7 is a computer-generated layout, with dimensions, of the building of example 2.
Figure 8:
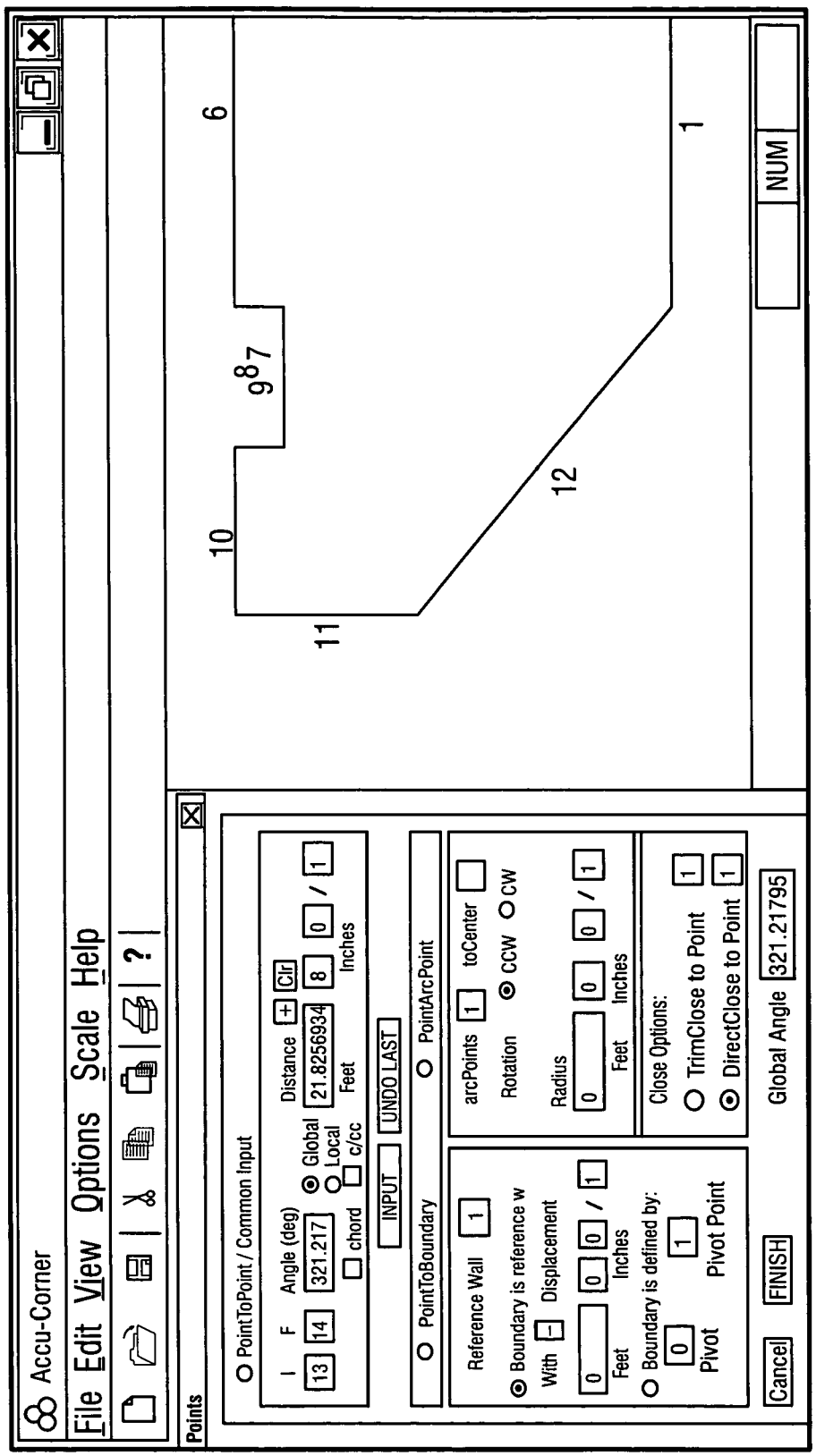
FIG. 8 is a computer-generated image showing the data entry field in conjunction with the resulting line segments from data entered therein.

The floor plan of FIG. 7, slightly more complex than the one used in Example 1, was used in this example. Here the operator started at the left end of the 42 foot wall and worked counter clock-wise around the building. The major difference between this example and the first is that for walls 4 and 5 the operator elected to use the "Local" angle option reather than the "Global" angle option as walls were entered into the system (FIG. 8). This was done to avoid errors that could occur, if the operator attempted to add and subtract angles.

Figure 9:
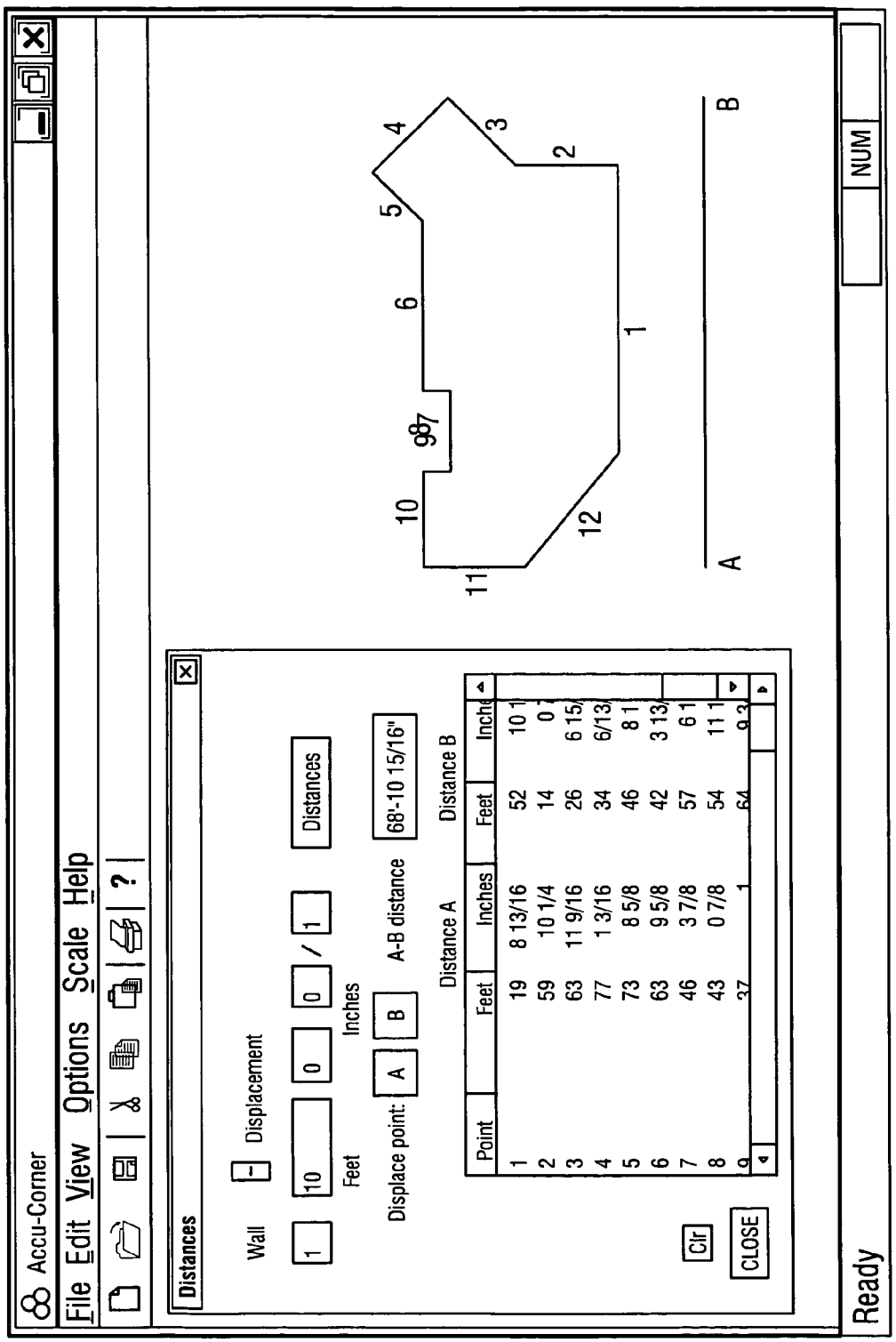
FIG. 9 is a computer-generated image, from data entered in accordance with example 2, showing distances and angles to various corners of a building from reference points A and B, along with the outline of the building which resulted from that same data.

Wall 12 was entered using the "Direct Close to Point 1" option. The global angle for wall 12 was given in the window below the "Close Options" box (321.21795°). The length of wall 12 was shown in the "Distance" window as 21.8256934 feet. In the View or Modify Wall Data screen this measurement was shown to be 21' 9-15/16". The "Distances" screen was then pulled up (FIG. 9) and the operator specified a negative 10' displacement from wall 1 for the location of the batter points. The displacement was negative because the batter points were disposed directly below wall 1 on the computer screen.

Finally, the operator then clicked on the "Print Distances" option and printed out the matrix of measurements, shown in FIG. 10, to be taken to the field for locating the corners of the building.

EXAMPLE 3

Figure 11:
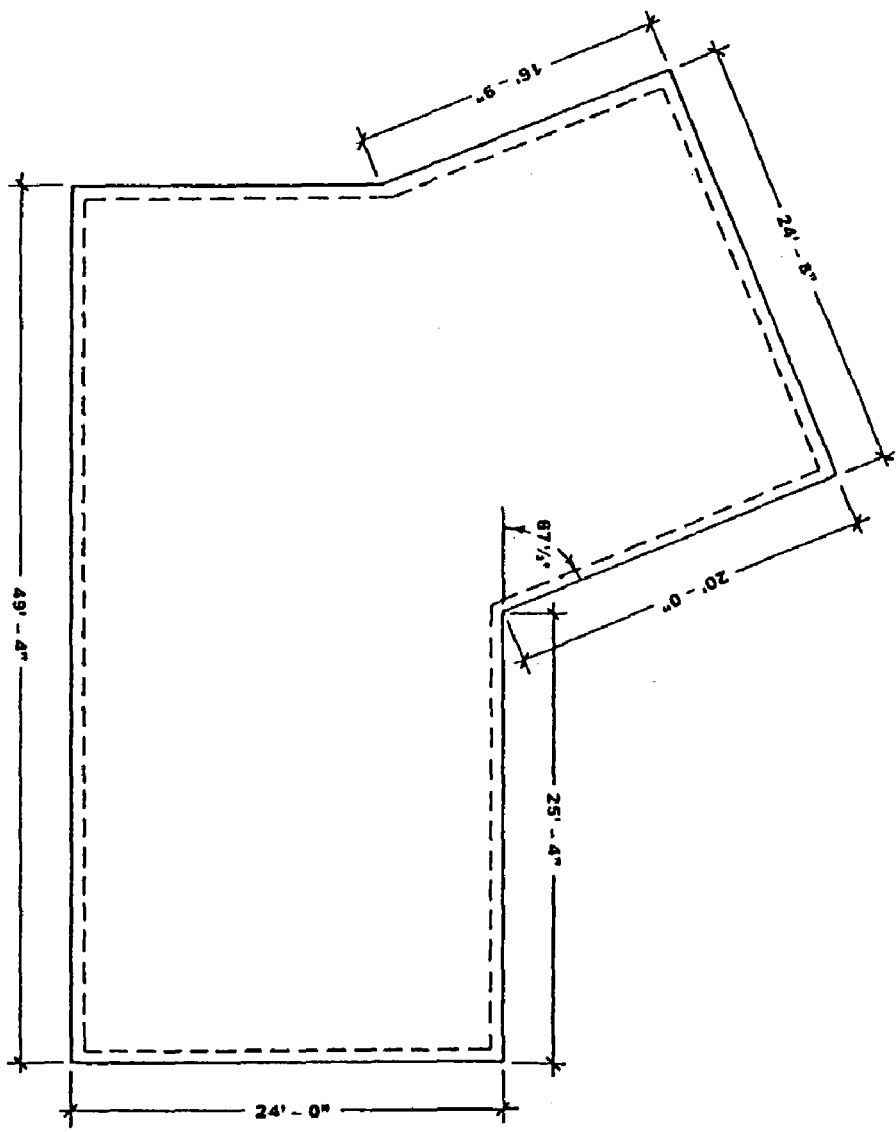
FIG. 11 is a computer-generated layout having inaccurate and or missing dimensions, as used in example 3.

The floor plan of FIG. 11, a classic example of a badly dimensioned drawing, was used in this example. One wall was not dimensioned at all; and it was likely that the 16' 9" dimension was "scaled", in that the designer did not trig out the dimension. The former error occurs on both hand-drawn and CAD-drawn plans, while the latter error occurs almost exclusively on hand-drawn plans, since dimensioning math is imbedded in virtually every CAD program.

Figure 12:
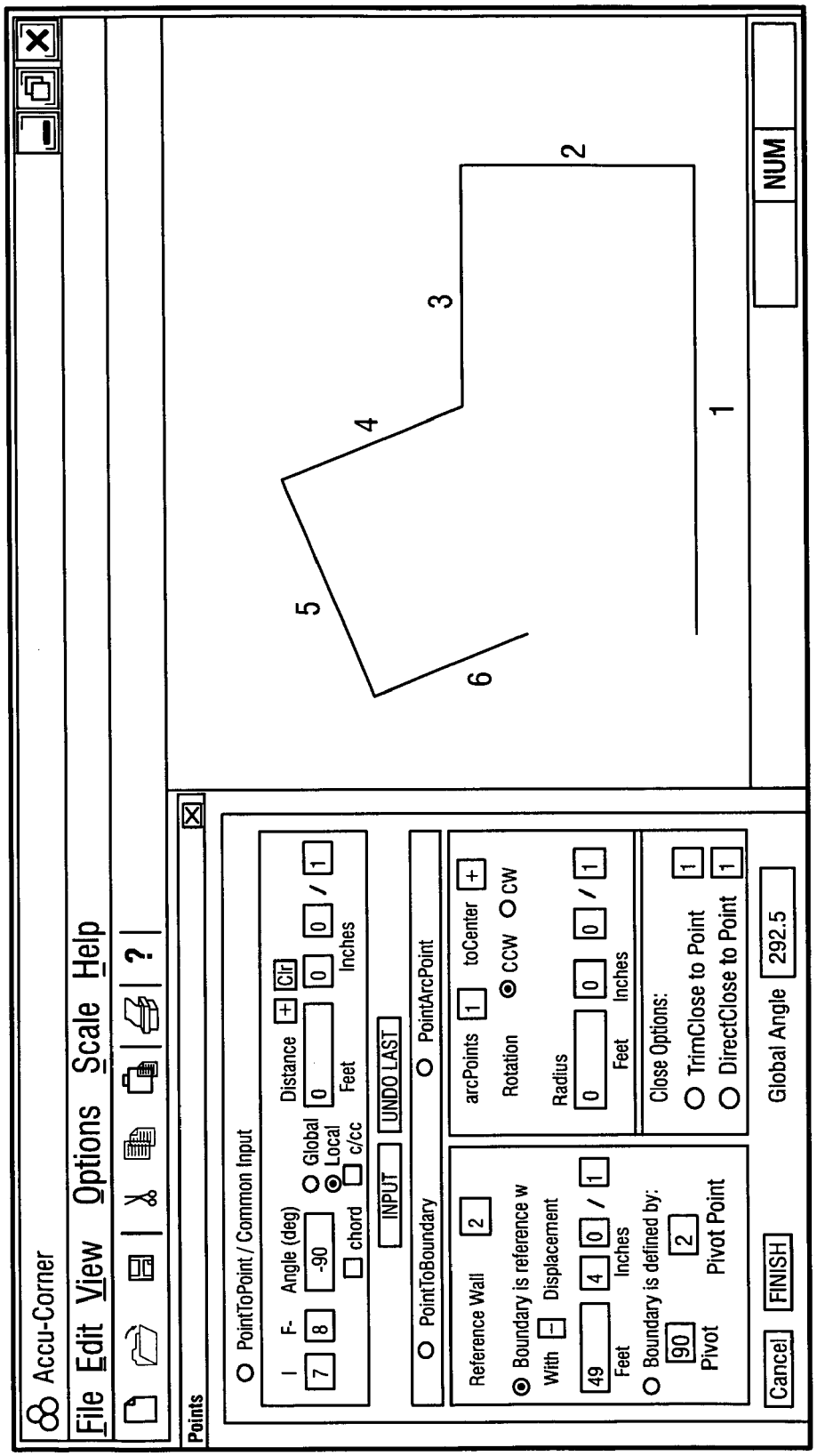
FIG. 12 is a computer-generated image showing the data entry field in conjunction with the resulting line segments from data entered therein.

Fortunately, the present invention was capable of effectively dealing with these types of errors. As shown in FIG. 12, in order to find the actual length of wall 6 (the 16' 9" wall on the plan), the operator entered a local angle of −90°, clicked on "point to Boundary", and then had the choice of clicking on either "Boundary is reference wall" or "Boundary is defined by". When "Boundary is reference wall" was selected, the operator then specified wall 2 as the reference wall and minus 49' 4" as the displacement and clicks "INPUT". Wall 6 then appeared, along with the prompt that the length of wall 6 is 16.835579'.

The operator then backed up and tried the other option of determining wall length to verify that the same measurement was obtained. Thus, the operator selected "Boundary is defined by" to create a temporary boundary to terminate wall 6. The operator then specified wall 1 as the wall to pivot and 90 as the number of degrees of pivot. Using this option the operator found that the length of wall 6 still emerged as 16.835579.

Figure 13:
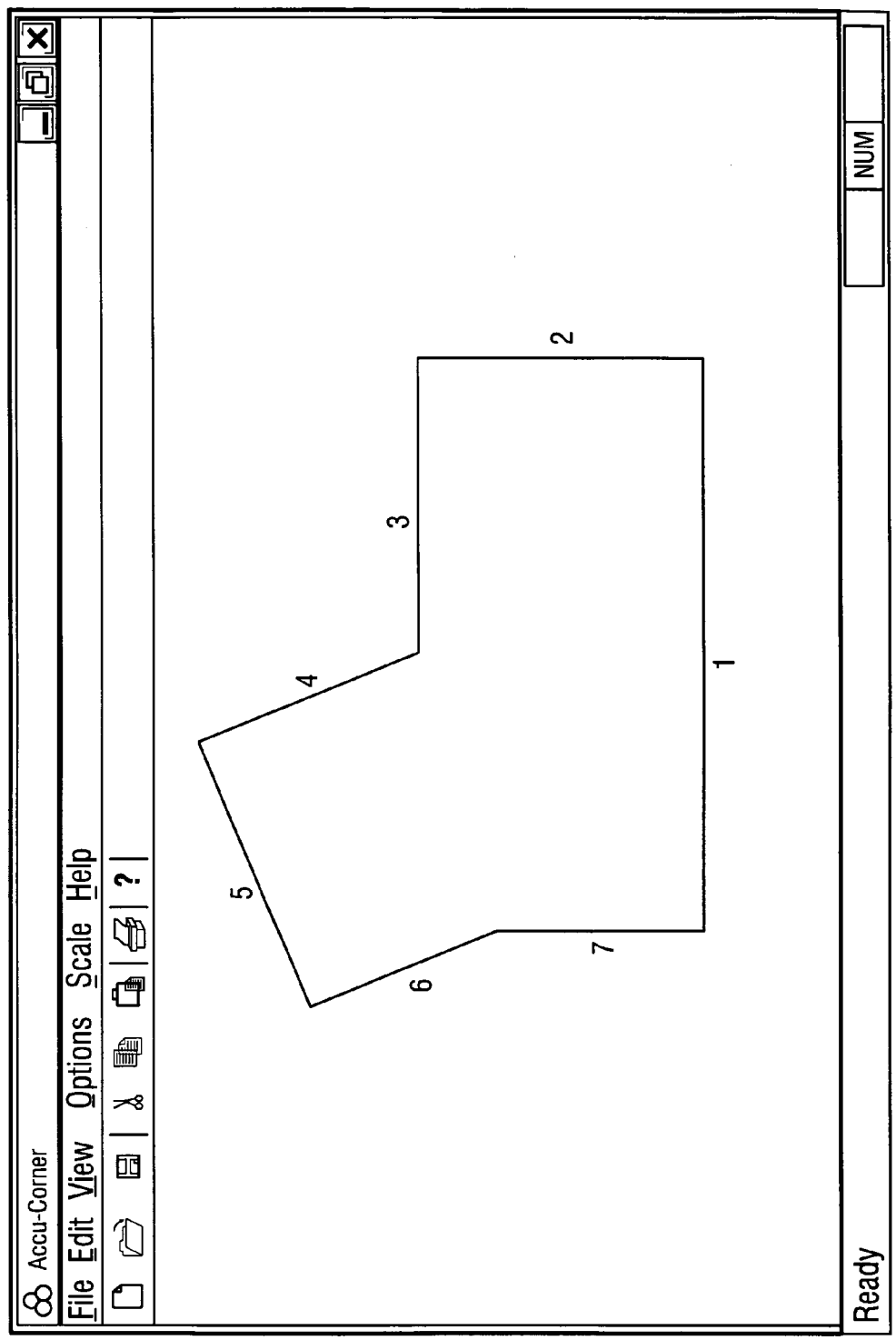
FIG. 13 is a computer-generated image showing the resulting line segments from data input by the user in example 3.

The operator then placed the last wall by clicking on "Direct Close to Point 1" the resulting computerized drawing is shown in FIG. 13.

Figure 14:
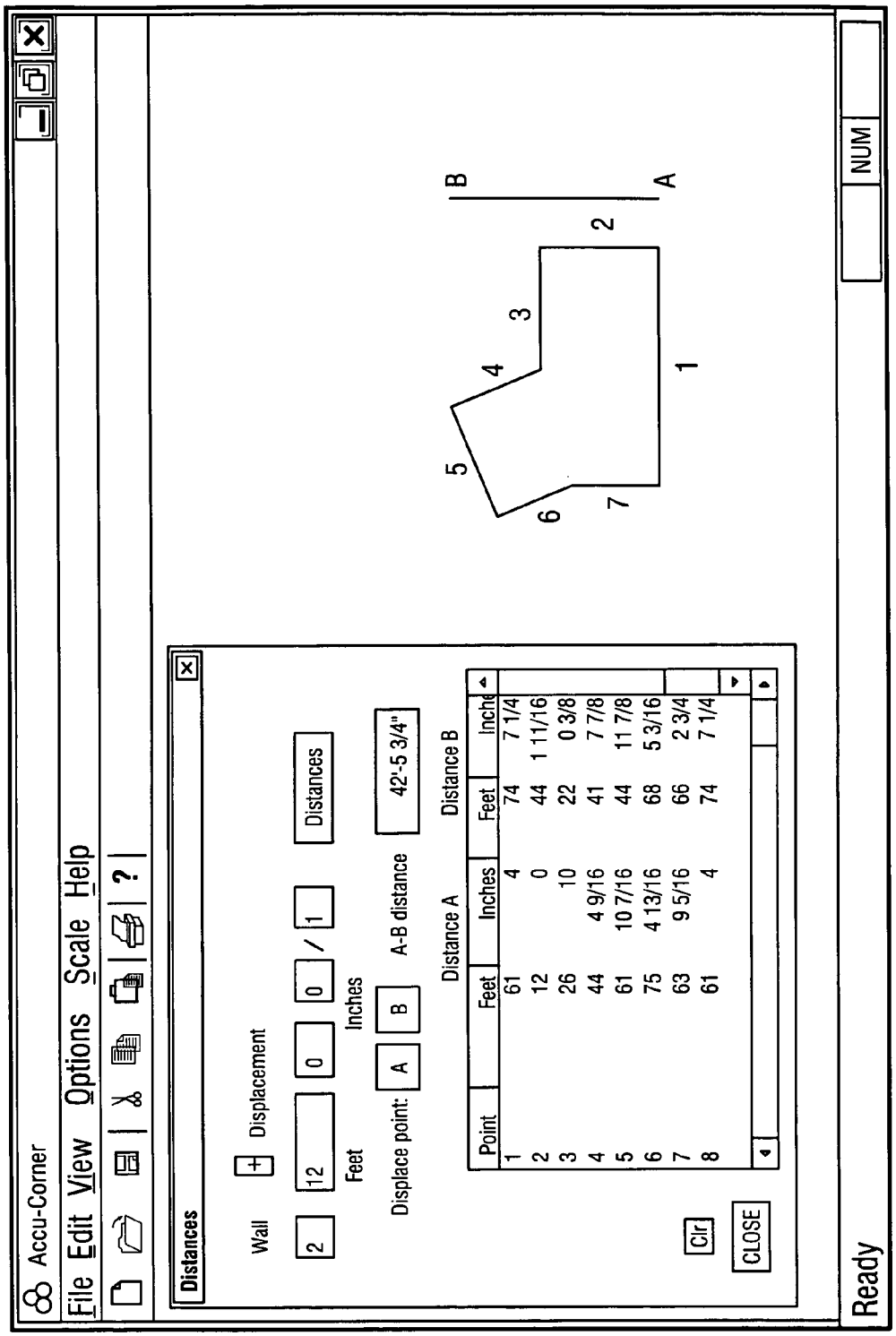
FIG. 14 is a computer-generated image, from data entered in accordance with example 3, showing distances and angles to various corners of a building from reference points A and B, along with the outline of the building which resulted from that same data.

The operator then chose the "Distances" option and selected wall 2 as the displacement wall, and +12' as the amount of displacement for the batter points. Upon clicking "INPUT," the program generated measurements and placed the line segment terminating in batter points A and B on the drawing. These measurements and the drawing are shown in FIG. 14.

The operator then clicked on the "Print Distances" option and printed out the matrix of measurements, shown in FIG. 15, to be taken to the field for locating the corners of the building.

EXAMPLE 4

Figure 16:
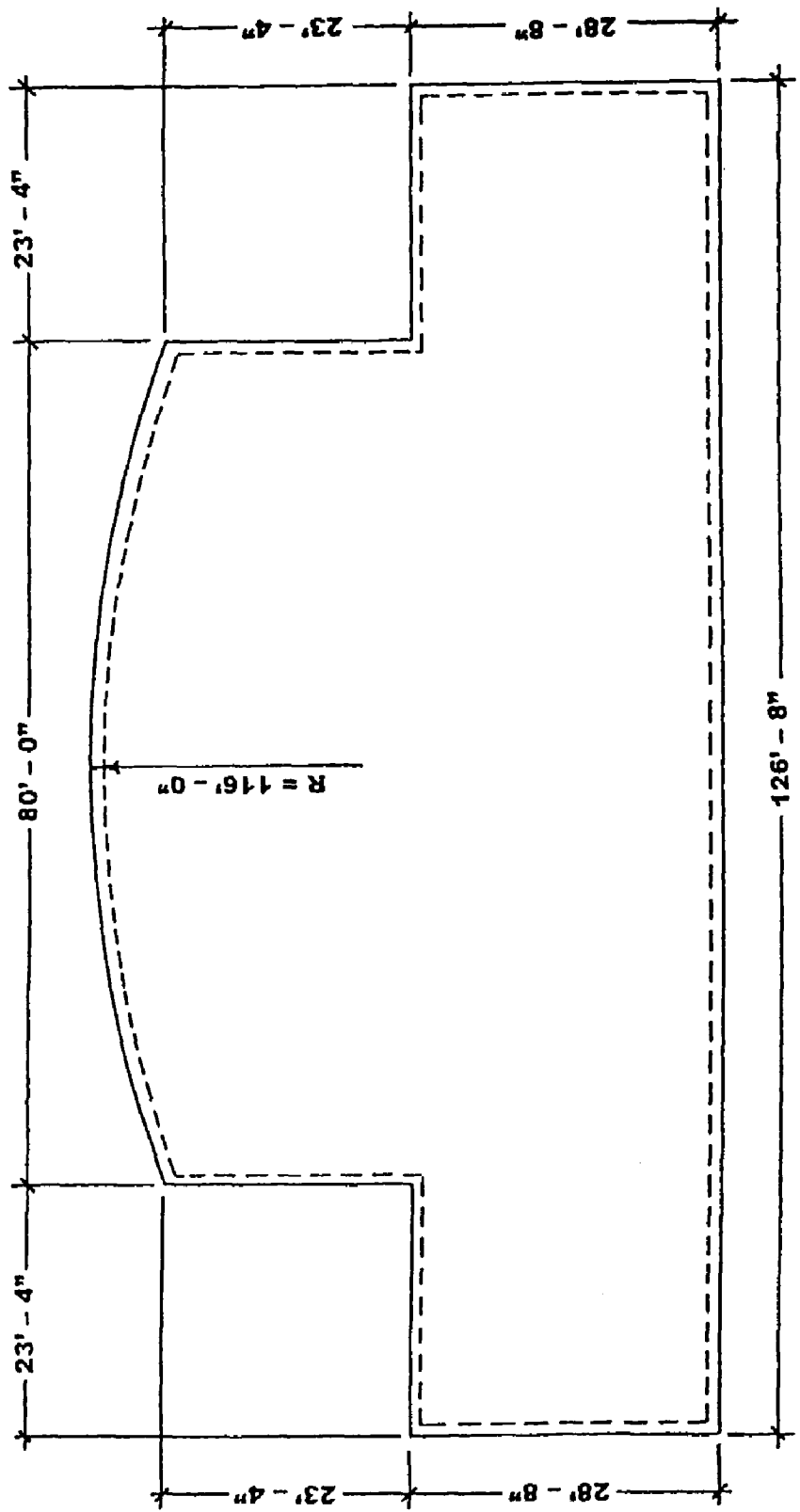
FIG. 16 is a computer-generated layout, used in example 4 of the present invention, wherein it is desired to be known the location of multiple points which act to define a curved portion of the layout.

FIG. 16 is a drawing of a building having a curved wall. The seven straight walls were input exactly like the straight walls in the previous examples by starting at the left corner of the curved wall, entering the 23' 4" wall, and working counter-clockwise around the building until wall 7 ended at the right end of the curved wall. Below is the screen showing the seven straight walls.

Figure 17:
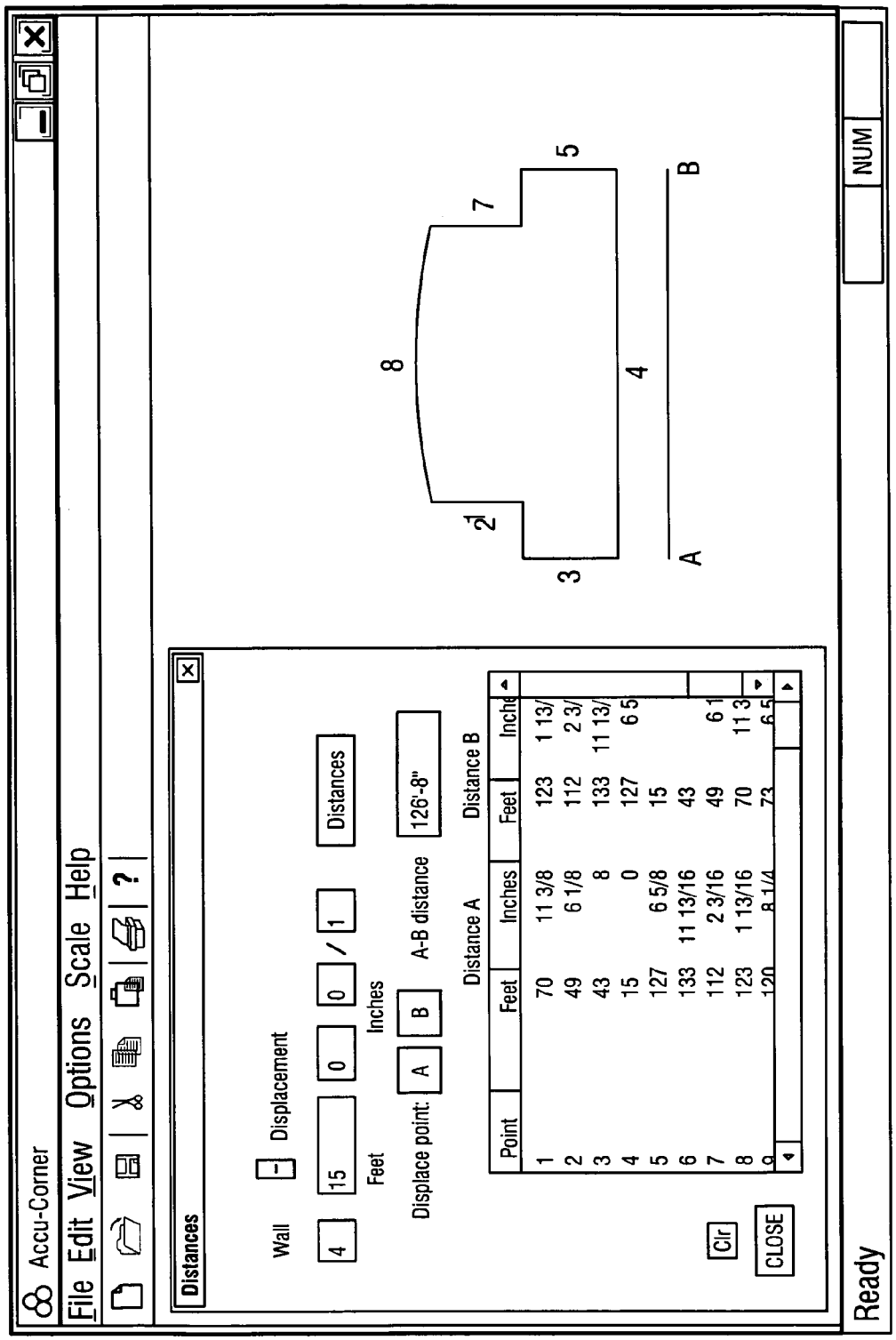
FIG. 17 is a computer-generated image, from data entered in accordance with example 4, showing distances and angles to various corners of a building from reference points A and B, along with the outline of the building which resulted from that same data.

The operator used the same "Points" screen to enter the curved wall as was used to enter straight wall data. After clicking INPUT, the operator then went to the distances screen and chose to displace the batter points minus 15' from wall 4. The resulting measurements and drawing are shown in FIG. 17.

Finally, the operator went to the "Print distances" option and printed out the matrix of triangulated data. Points 8 as well as a through S were created indicating points on the curved wall. The output obtained from this example is shown in FIG. 18.

EXAMPLE 5

Figure 19:
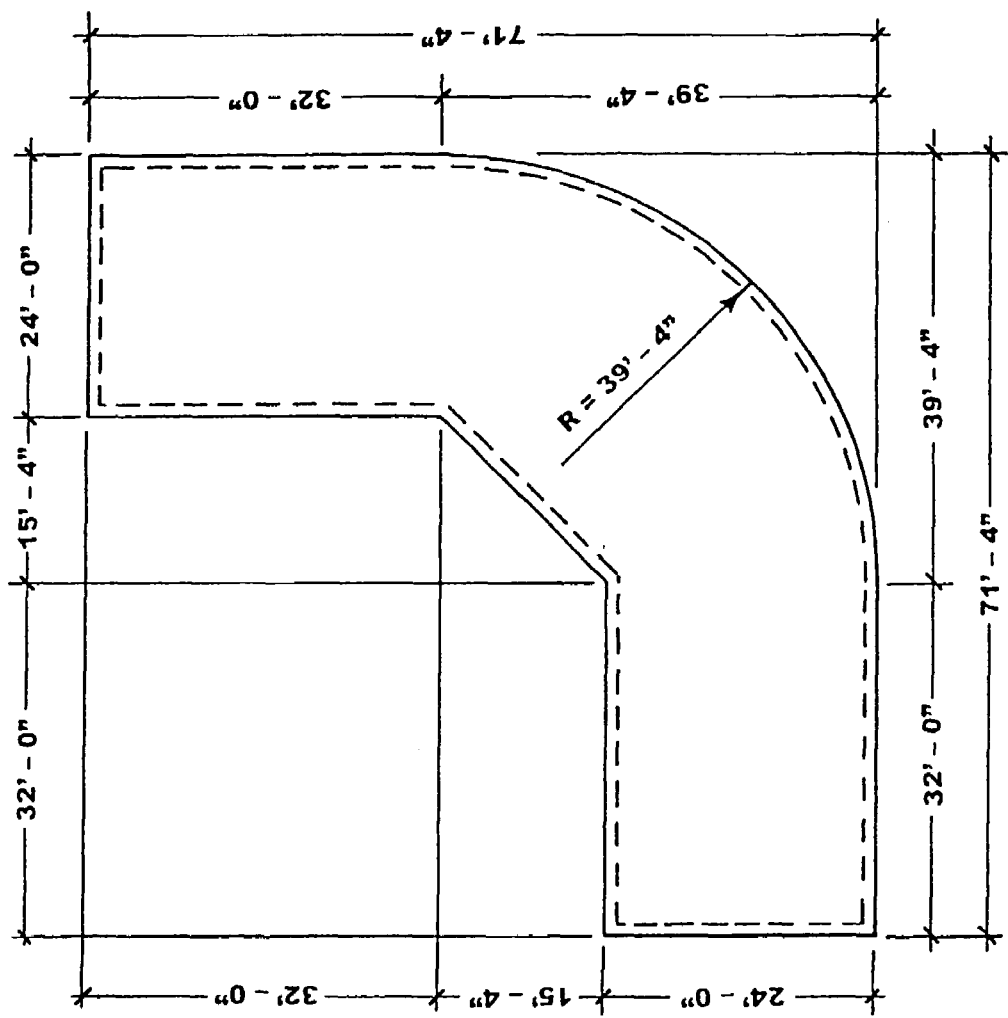
FIG. 19 is a computer-generated layout, used in example 5 of the present invention, wherein it is desired to be known the location of multiple points which act to define a curved portion of the layout.

FIG. 19 is a drawing having a curved side of unknown length. The operator started by inputting the far left 24' 0" wall and moving counter-clockwise around the building.

Figure 20:
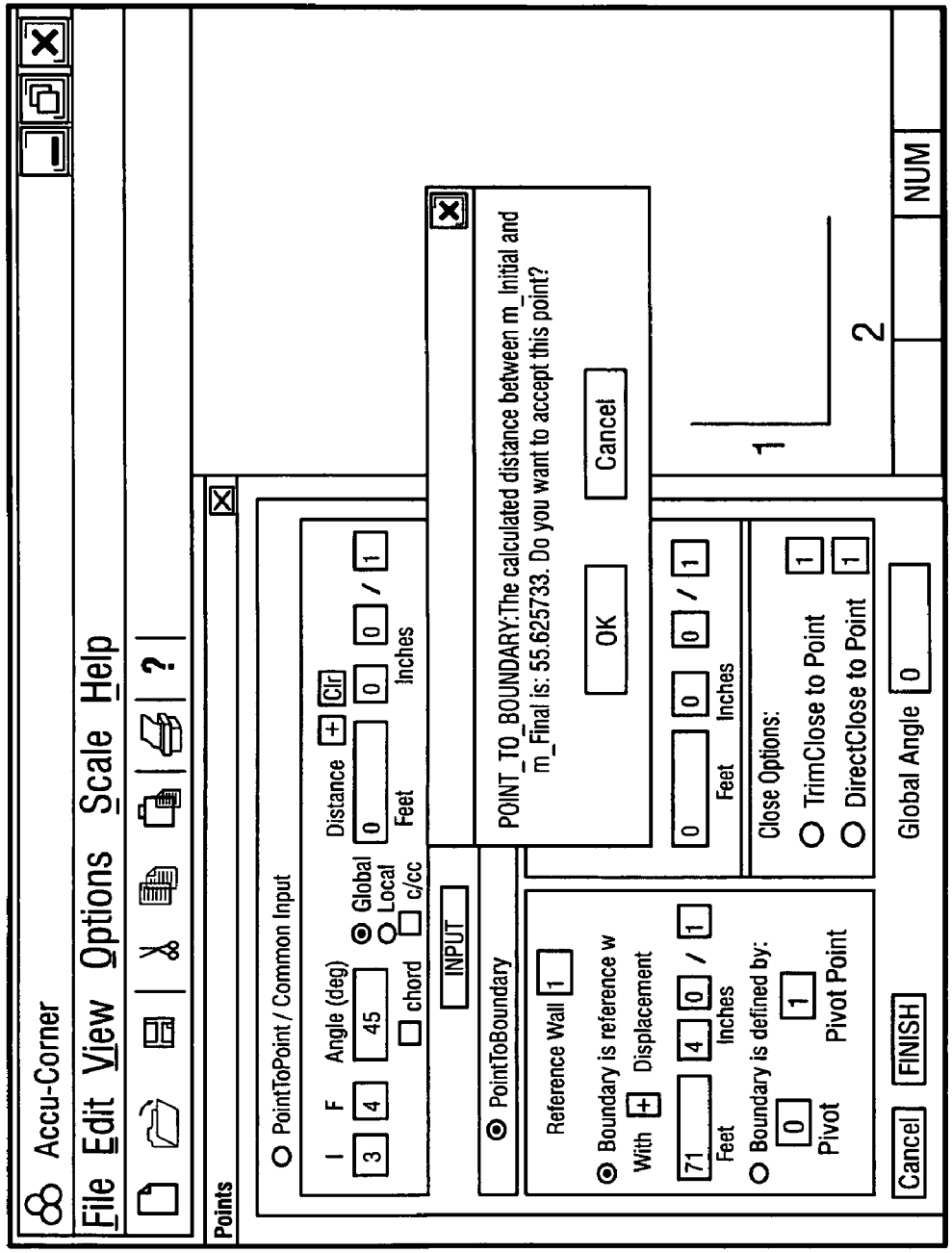
FIG. 20 is a computer-generated image showing a pop-up window wherein a calculated cord length is displayed.
Figure 21:
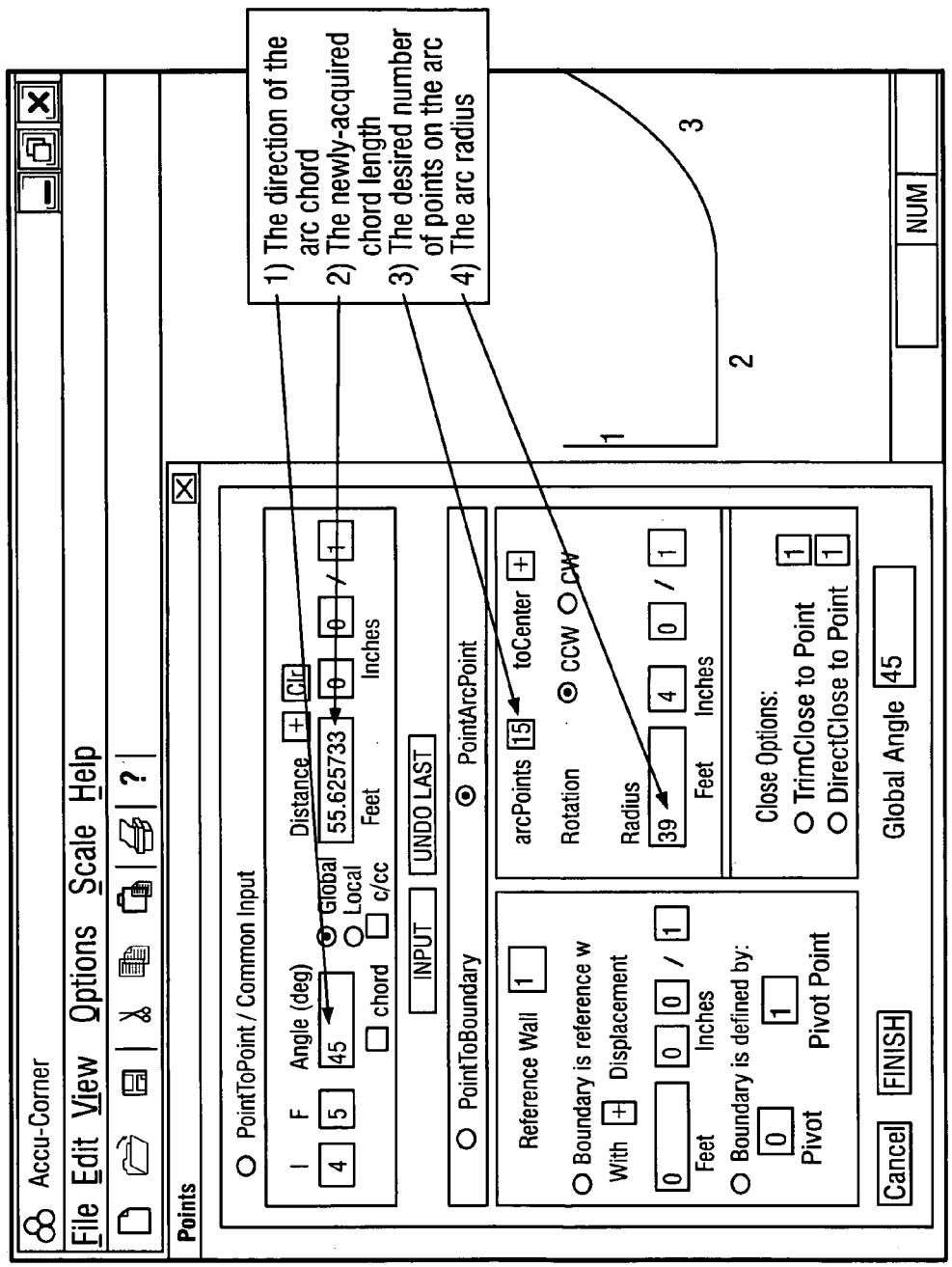
FIG. 21 is a computer-generated image showing the user interface wherein the user enters data which the computer uses to calculate arc length.

After the 32' 0" wall was input, the operator displaced the 24' 0" wall +71' 4" to serve as a termination boundary for the arc chord. Ultimately this chord was not visible on the screen, but the operator was able to determine the chord length in this manner. FIG. 20 shows the prompt that came up giving the length of the chord as 55.625733°. The operator then recorded this distance on a note pad and canceled out of the screen. FIG. 21 is a computer-generated image showing data as input and the resulting line segments. Walls 4, 5, and 6 were entered. The length of wall 7 (like the length of the arc chord) was established by displacing the far left 24' 0" wall +32' 0". This temporary boundary served to terminate wall 7 at the correct length.

When the INPUT button was clicked a prompt came up giving the length of wall 7 as being 21.684607'. The operator then clicked the "OK" button and wall 7 appeared on the screen.

Figure 22:
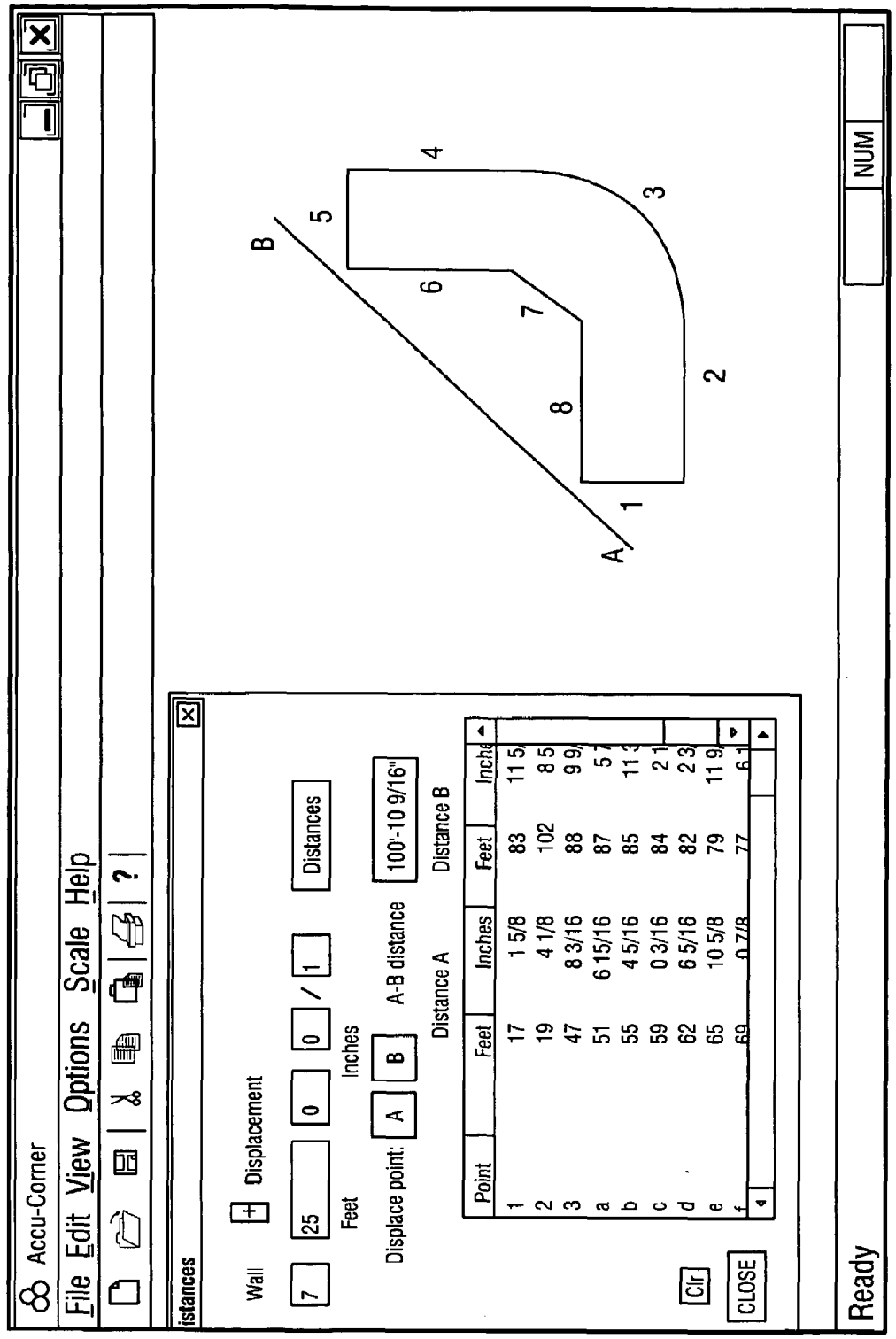
FIG. 22 is a computer-generated image, from data entered in accordance with example 5, showing distances and angles to various corners of a building from reference points A and B, along with the outline of the building which resulted from that same data.

After "closing" the foundation, by using the "Direct Close" to Point 1 feature, the operator brought up the "Distances" screen, and specified wall 7 as the wall to displace +15' as the displacement distance, thus placing the line segment, which terminates in batter points A and B, 15 feet from and parallel with wall 7. The resulting drawing, as well as a list of the measurements from each batter point to each corner and numerous points on the curve are shown in FIG. 22.

Finally, the operator went to the "Options" pull-down menu and selected "Print distances," thus producing the matrix of triangulated distances shown in FIG. 23.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of determining a set of layout measurements comprising the steps of:
   receiving building element data;
   determining relative positions of at least two measurement points derived from the building element data, said determining step comprising the steps of:
      providing a first building element comprising at least one measurement point;
      placing a second building element comprising at least one measurement point at a required distance from the first building element at a required relative angle;
      placing a third building element adjacent comprising at least one measurement point at a required distance from the second building element at a required relative angle; and
      placing any remaining building elements in a likewise manner until a boundary of the building comprising the measurement points is complete;
   calculating distances between the at least two measurement points and at least two batter points located away from all of the at least two measurement points; and
   providing the calculated distances.

2. The method of claim 1 wherein the placing a second building element step comprises placing a second building element adjacent to the first building element.

3. The method of claim 1 wherein the step of providing the calculated distances comprises providing a list of all measurement points and the calculated distances from each measurement point to each batter point.

4. The method of claim 3 wherein the step of providing the calculated distances further comprises providing distances in units of feet and inches.

5. The method of claim 3 wherein the step of providing the calculated distances further comprises providing distances in units of feet and decimal fractions of a foot.

* * * * *